United States Patent [19]

Koizumi

[11] Patent Number: 5,249,105
[45] Date of Patent: Sep. 28, 1993

[54] SURFACE LIKE LIGHT EMITTING ORNAMENTAL DEVICE USING OPTICAL FIBERS

[75] Inventor: Yoshimichi Koizumi, Kyoto, Japan

[73] Assignee: Aromac Co. Ltd., Kyoto, Japan

[21] Appl. No.: 10,455

[22] Filed: Jan. 26, 1993

Related U.S. Application Data

[63] Continuation of Ser. No. 780,450, Oct. 22, 1991, abandoned, which is a continuation of Ser. No. 474,770, filed as PCT/JP89/00694 on Jul. 10, 1989, abandoned.

[30] Foreign Application Priority Data

Jul. 14, 1988 [JP] Japan .............................. 63-93523[U]

[51] Int. Cl.⁵ .............................................. F21V 8/00
[52] U.S. Cl. ............................................ 362/31; 362/32; 362/806
[58] Field of Search .................... 362/31, 32, 311, 351, 362/806

[56] References Cited

U.S. PATENT DOCUMENTS

| | | | |
|---|---|---|---|
| 4,229,783 | 10/1980 | Eberhard | 362/346 |
| 4,519,017 | 5/1985 | Daniel | 362/32 |
| 4,714,983 | 12/1987 | Lang | 362/31 |
| 4,761,047 | 8/1988 | Mori | 362/32 |
| 4,763,984 | 8/1988 | Awai et al. | 362/32 |
| 4,802,066 | 1/1989 | Mori | 362/32 |
| 4,885,663 | 12/1989 | Parker | 362/32 |
| 4,907,132 | 3/1990 | Parker | 362/31 |

FOREIGN PATENT DOCUMENTS

| | | |
|---|---|---|
| 51-4344 | 1/1976 | Japan . |
| 55-25920 | 2/1980 | Japan . |
| 61-201100 | 12/1986 | Japan . |
| 62-179708 | 11/1987 | Japan . |

*Primary Examiner*—Richard R. Cole
*Attorney, Agent, or Firm*—Morgan & Finnegan

[57] ABSTRACT

This invention is an optical ornamental device comprising, in combination, a number of optical fibers (1) and at least one light source body (10). The optical fibers (1) are intertwined in the direction of the length to form a surface-like light leakage ornamental section (7) having a light scattering film layer (14) provided on one surface thereof to thereby increase the luminance.

1 Claim, 2 Drawing Sheets

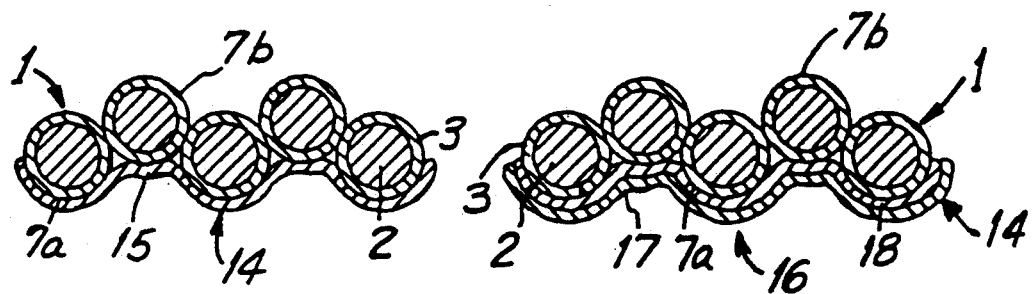
FIG.4A   FIG.4B
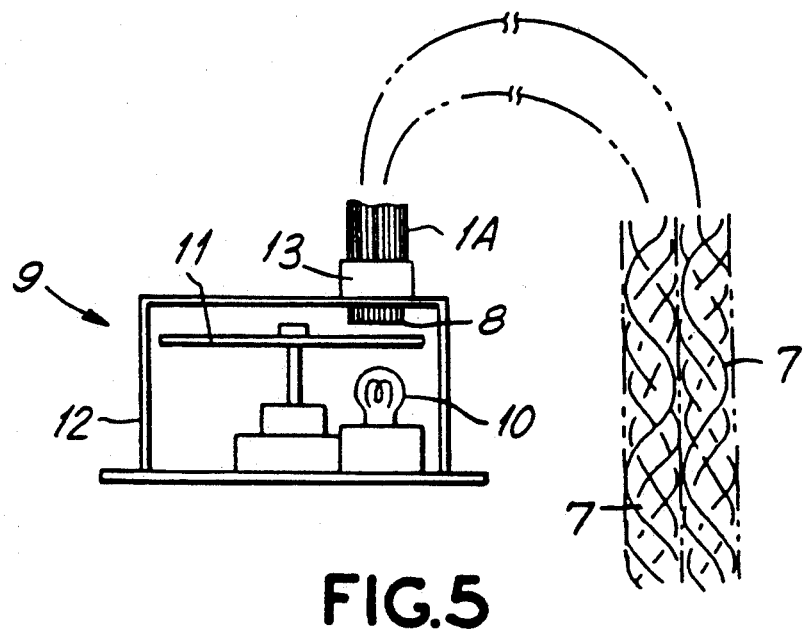
FIG.5
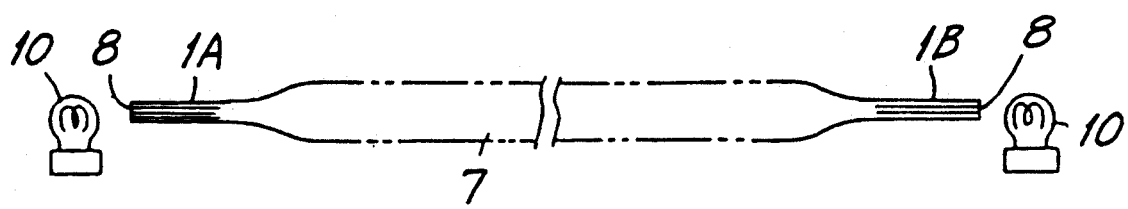
FIG.6

# SURFACE LIKE LIGHT EMITTING ORNAMENTAL DEVICE USING OPTICAL FIBERS

This is a continuation of co-pending application Ser. No. 07/780,450, filed on Oct. 22, 1991 which is a continuation of Ser. No. 07/949,770, filed as PCT/JP89/00694 on Jul. 10, 1989, both now abandoned.

TECHNICAL FIELD

This invention relates to a surface-like light emitting ornamental device using optical fibers, constructed by intertwining a number of optical fibers generally into surface form, the intertwined portion forming a surface-like light emitting ornamental section, and particularly it relates to a surface-like light emitting ornamental device using optical fibers, designed to provide sufficiently high luminance to use the device as surface-like ornamental illuminating means.

BACKGROUND ART

As is known, an optical fiber is formed of a linear element comprising a core portion of relatively high refractivity and a clad portion of lower refractivity than that of said core portion and high transparency. This optical fiber has properties such that it conducts light incident on one end of the core portion to the other end with high efficiency. More particularly, light incident on one end of the core portion is efficiently led to the other end while repeating total reflection at the interface between said core portion and said clad portion many times.

Heretofore, an optical ornamental device utilizing said properties of optical fibers has comprised a light inlet end provided by one end of a bunch of optical fibers, the other end being developed to form a light emitting ornamental section according to a suitable ornamental pattern, said light inlet end being opposed to a screened light source, said light emitting ornamental section emitting light in dotted form. Such optical ornamental device is nothing more than a design such that light incident on the inlet end side of optical fibers is led to the outlet end side and emitted in dotted form from the outlet end side; thus, it is lacking in ornamental variegation.

On the other hand, optical fibers can be arranged to overcome total reflection at the interface between the core portion and the clad portion so as to allow part of light traveling in the direction of length to leak in intermediate portions of the optical fibers. Among known means for allowing part of light to leak in intermediate portions are (i) locally breaking the outer peripheral surfaces of optical fibers, (ii) locally breaking the interiors of optical fibers, (iii) forcing optical fibers to bend or curve, (iv) contacting a refractive solid with the outer peripheral surfaces of optical fibers. It is also known to apply said means to optical fibers to form light leakage portions in intermediate portions of the optical fibers, such optical fibers being then gathered to provide a surface-like light emitting device which allows light to leak in surface form. However, a conventional surface-like light emitting device based on said means is far from sufficient in the luminance of the surface-like light emitting section, so that it is of no use when used as an interior ornament illuminating device.

DISCLOSURE OF THE INVENTION

Accordingly, an object of the invention is to provide a surface-like light emitting ornamental device using optical fibers, having sufficient luminance to enable the device to be used as a surface-like light emitting ornamental device for interior use.

Another object of the invention is to provide a surface-like light emitting ornamental device using optical fibers capable of forming a unique variegated surface-like light emitting section.

In achieving the above objects, the invention provides a surface-like light emitting ornamental device using optical fibers, comprising, in combination, of optical fibers having a core portion of relatively high refractivity and a clad portion of lower refractivity than that of said core portion and high transparency, and adapted to lead light incident on one end of said core portion to the other end of said core portion with said light repeating total reflection at the interface between said core portion and said clad portion many times, and a light source body disposed at least at one end of said optical fiber, characterized in that:

a number of optical fibers are intertwined in the direction of the length to form a light leakage ornamental section which overcomes total reflection, one surface side of said surface-like light leakage ornamental section having a translucent light scattering film layer integrally formed thereon.

Since the surface-like light emitting ornamental device using optical fibers according to the invention constructed in the manner described above is fabricated by intertwining a number of optical fibers, the optical fibers can be continuously bent or curved in the intertwined region, said bending or curving overcoming total reflection in the interiors of the optical fibers, thus forming a curved light leakage portion. The linear light leakage section can be constructed in surface form by interlacing said optical fibers in surface form. On the other hand, a translucent light scattering film layer is integrally formed on one surface of the surface-like light leakage portion thus formed, and under the influence of the refracting or scattering action of said translucent light scattering film layer, the luminance of said surface-like light leakage section can be increased. One end side of the optical fibers constructed in this manner is opposed to a screened light source, and when light falls on one end side of the optical fibers, the light transmitted into the optical fibers leaks to the outside in the surface-like light leakage section; at this time, under the influence of the refracting and scattering actions of the translucent light scattering film layer, the light leaks at high luminance.

BRIEF DESCRIPTION OF THE DRAWINGS

FIG. 4 A and B are schematic cross-sectional views showing different examples of surface-like light emitting ornamental sections;

FIG. 5 is a schematic side view showing an example of screened light source means; and FIG. 6 is a schematic block diagram showing an example of a combination with screened light source means in the device.

BEST MODE FOR EMBODYING THE INVENTION

A surface-like light emitting ornamental device using optical fibers according to an embodiment of the invention will now be described with reference to the drawings.

Figure 1:
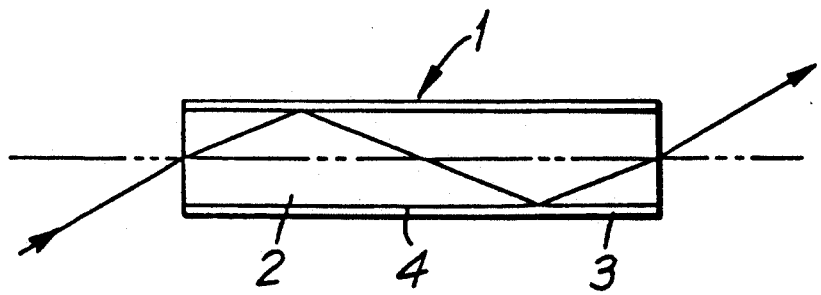
FIG. 1 is a schematic side view, in section, showing the light leading principle in an optical fiber applied to the present invention.

FIG. 1 shows an example of an optical fiber 1. The optical fiber 1 comprises a core portion 2 extending axially in the middle and a clad portion 3 extending axially to surround said core portion 2. The core portion 2 of the optical fiber 1 is made of a material of relatively high refractivity and high transparency, while the clad portion 3 is made of a material of lower refractivity than that of said core portion 2 and high transparency. Therefore, in said optical fiber 1, light incident on one end of said core portion 2 is led to the other end of the core portion 2 while repeating total reflection at the interface 4 between the core portion 2 and the clad portion 3 many times.

Figure 2:
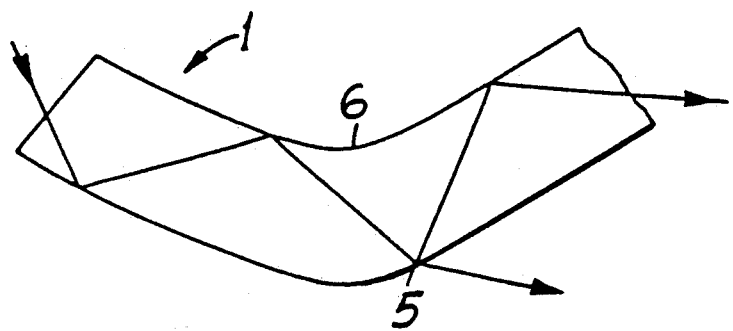
FIG. 2 is a schematic side view, in section, which, when an optical fiber strand is bent, shows how light leaks in said bent portion on the basis of the light leading principle.

On the other hand, in the case where the optical fiber 1 is suitably bent or curved in an intermediate portion thereof as shown in FIG. 2, total reflection at the interface 4 between the core portion 2 and the clad portion 3 is overcome, thereby forming a light leakage section 5 in said bent or curved portion where light leaks to the outside.

Figure 3:
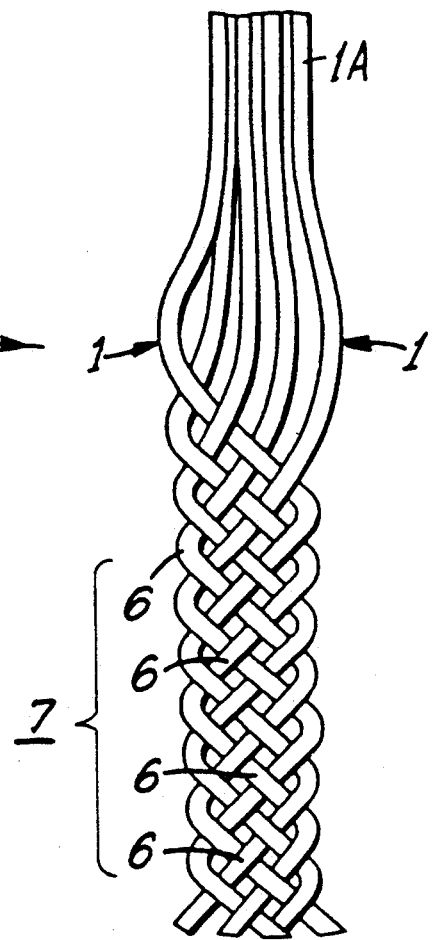
FIG. 3 is a schematic side view showing an example in which a surface-like light emitting ornamental device is formed by braiding five optical fiber strands in a flat braid fashion.

Basically, the invention is based on the principle described above to form the light leakage section 5. In one example, as shown in FIG. 3, said optical fibers 1 are intertwined to form bent or curved portions 6. According to this example, five optical fibers 1 are interlaced in a flat braid fashion, thereby continuously forming bent or curved portions 6, which form a surface-like light emitting ornamental section 7. In this example, if the number of optical fibers 1 is increased, a correspondingly wider light emitting ornamental section 7 can be formed. In addition, optical fibers used in the invention which are suitable from the standpoints of interlacing and formation of a light leakage section by interlacing are about 0.25 mm to about 1.5 mm in diameter. In this invention, formation of said bent or curved portions is not limited to said interlacing in a flat braid fashion; other forms of interlacing, such as braiding, weaving, twisting and knotting may be employed.

The group of optical fibers interlaced in this manner is suitably gathered at least at one end side 1A to form a light receiving end 8 positioned in opposed relation to screened light source means 9. The screened light source means 9 may comprises a light source body 10 and a filter 11, such as a rotatable filter which changes the color of light from said light source body 10, said light source body and said filter being housed in a screen casing 12. The end 1A at the gathered light receiving end 8 of the optical fibers group is inserted into an attachment 13 provided in the screen casing 12 in said screened light source means 9 and is positioned in opposed relation to the light source body 10 with said filter 11 interposed therebetween. The interlaced optical fibers have the opposite ends 1A and 1B formed as light receiving ends 8 positioned in opposed relation to said screened light source means 9 so that light is admitted at the opposite ends.

In the present invention, a light scattering film layer 14 which is translucent is integrally formed on one surface of the light leakage section 7 constructed in surface form. The light scattering film layer 14 functions to increase the luminance of the light leakage ornamental section 7 by the refracting or scattering action. The light scattering film layer 14 is formed preferably of a coating agent 15. The coating agent 15 is preferably an acrylic type polymer emulsion, which is applied to one surface 7a of the surface-like light leakage ornamental section 7. The acrylic type polymer emulsion is preferably a translucent milky white coating agent, which may have a colored pigment, in the range including a white type pigment, added thereto. On the other hand, the light scattering film layer 14 can be formed extremely effectively of a translucent adhesive agent. In one example, an adhesive tape 16 in the form of a suitable base sheet 17 having an adhesive agent 18 applied to one surface thereof is advantageously used in this invention in that it is capable of fixing the surface-like light leakage ornamental section 7 in definite form and also capable of forming a light scattering film layer 14 by means of said adhesive agent 18. The base sheet 17 is selected from a group consisting of synthetic resin sheets, cloth sheets, paper sheets, metal foil sheets and the like. In addition, the light scattering film layer 14 may be provided over the entire surface of said surface-like light leakage ornamental section 7 or locally provided corresponding to a predesigned picture, character, pattern or the like. In the former case where the light scattering film layer 14 is provided over the entire area of one surface 7a of the surface-like light leakage ornamental section 7, a mask member representing a picture, character, pattern or the like may be provided on the other surface 7b of said light leakage ornamental section 7, thereby causing said light leakage ornamental section 7 to shine locally.

Further, in this invention, before the light scattering film layer 14 is provided on said surface-like light leakage ornamental section 7, the outer peripheral portions of the optical fibers 1 may be broken. In order that the present inventive device may allow light to leak substantially uniformly in the direction of the length, it is preferable that the breaks formed in said optical fibers 1 be increased in size and in depth as the distance from said gathered light receiving end is increased.

INDUSTRIAL APPLICABILITY

A surface-like light emitting ornamental device using optical fibers according to the present invention constructed in the manner described above comprises a number of optical fiber strands intertwined to provide light leakage portions formed along the individual strands by continuous bending, said light leakage portions being gathered to form a surface-like light emitting ornamental section, and a translucent light scattering film layer disposed on one surface of said surface-like light emitting ornamental section, thereby increasing the luminance of said surface-like light emitting ornamental section.

Therefore, the surface-like light emitting ornamental device using optical fibers according to the invention is suitable for mass production in that it is simple in construction and easy to process; thus, a surface-like light emitting ornamental device having stabilized performance can be provided.

Further, the surface-like light emitting ornamental device using optical fibers according to the invention is capable of causing the individual strands in the surface-like light emitting ornamental section to shine in curved form and also in surface form as a whole corresponding to the interlacing configuration, and it has no possibility of the light emitting portions generating heat and can be effectively applied as a surface-like ornamental illuminating device.

Further, the surface-like light emitting ornamental device using optical fibers according to the invention may employ a continuously color-changing system as a surface-like light emitting ornamental section, so that movement of color-changing points can be visualized according to the pattern corresponding to the interlacing. Thus, the invention provides a unique variegated optical ornamental device.

What is claimed is:

1. A surface-like light emitting ornamental device using optical fibers, comprising, in combination, optical fibers having a core portion of relatively high refractivity and a clad portion of lower refractivity than that of said core portion and high transparency, and adapted to lead light incident on one end of said core portion to another end of said core portion with said light repeating total reflection at an interface between said core portion and said clad portion many times, and a light source body disposed at least at one end of said optical fiber, characterized in that:

a number of optical fibers are intertwined in a direction of the length of said fibers to form a surface-like light leakage ornamental section which overcomes total reflection, one surface side of said surface-like light leakage ornamental section having a light scattering film layer of a translucent synthetic resin coating integrally formed thereon, a second surface side opposed to said one surface side of said surface-like leakage ornamental section being uncoated by said film layer.

* * * * *